(12) United States Patent
Mody et al.

(10) Patent No.: US 12,504,880 B2
(45) Date of Patent: Dec. 23, 2025

(54) MEMORY ALLOCATION FOR MICROCONTROLLER EXECUTION

(71) Applicant: Texas Instruments Incorporated, Dallas, TX (US)

(72) Inventors: Mihir Narendra Mody, Bangalore (IN); Prithvi Shankar Yeyyadi Anantha, Bangalore (IN); Mel Alan Phipps, Sugar Land, TX (US); Prasad Jondhale, Bangalore (IN); Mohd Asif Farooqui, Bangalore (IN); Shailesh Ghotgalkar, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 18/770,866

(22) Filed: Jul. 12, 2024

(65) Prior Publication Data

US 2024/0370170 A1 Nov. 7, 2024

Related U.S. Application Data

(63) Continuation of application No. 18/060,457, filed on Nov. 30, 2022, now Pat. No. 12,067,244.

(51) Int. Cl.
*G06F 3/06* (2006.01)

(52) U.S. Cl.
CPC ......... *G06F 3/0611* (2013.01); *G06F 3/0659* (2013.01); *G06F 3/0679* (2013.01)

(58) Field of Classification Search
CPC ..... G06F 3/0611; G06F 3/0659; G06F 3/0679
See application file for complete search history.

(56) References Cited

U.S. PATENT DOCUMENTS

| | | | |
|---|---|---|---|
| 2009/0235013 A1* | 9/2009 | Seo | G06F 12/0246 711/E12.008 |
| 2016/0357484 A1 | 12/2016 | Schaffert | |
| 2018/0341424 A1* | 11/2018 | Mandela | G06F 9/445 |
| 2020/0174926 A1 | 6/2020 | Roozbeh et al. | |
| 2022/0188238 A1* | 6/2022 | Su | G06F 11/1068 |
| 2022/0413708 A1 | 12/2022 | Canepa | |

* cited by examiner

*Primary Examiner* — Jane W Benner
(74) *Attorney, Agent, or Firm* — Xianghui Huang; Frank D. Cimino (57) ABSTRACT

Various examples disclosed herein relate to allocation of code and data of application software among memory of a microcontroller unit (MCU), and more particularly to allocating portions of the application software to random access memory or flash memory of an MCU based on information associated with of each portion of the application software. A method is provided herein that comprises instructing an MCU to execute an application software. The method further comprises obtaining information indicative of a performance of portions of the application software on the MCU and capacity requirements of the portions of the application software, and designating, based on the information, each of the portions of the application software for execution from either a first memory or a second memory when deployed to one or more MCUs.

20 Claims, 6 Drawing Sheets

MEMORY ALLOCATION FOR MICROCONTROLLER EXECUTION

CROSS REFERENCE TO RELATED APPLICATIONS

This application is a continuation of and claims priority to U.S. patent application Ser. No. 18/060,457, filed Nov. 30, 2022, which is hereby incorporated herein by reference in its entirety.

TECHNICAL FIELD

This relates generally to allocation of software among memory of a microcontroller unit (MCU), and more particularly to allocating portions of code and/or data for execution from different memories of an MCU based on information identified for each portion of the code/data during the execution of the software.

BACKGROUND

Microcontroller units (MCUs) are designed to run software programs and perform functions enabled by running the software programs. To do so, MCUs have processing nodes configured to execute software and memory coupled with the processing cores that stores the instructions and data of the software. For example, MCUs can have one or more central processing units (CPUs) that communicate with random access memory (RAM) to execute such software programs. If a software program is too large to be executed from RAM, the MCU may additionally utilize flash memory, or some other type of memory, that has a larger capacity to store instructions and data of the software. MCUs generally execute software programs with greater speed and reduced latency from RAM, however, increasing complexity and size of the programs may require the MCU to execute from RAM and/or flash memory to perform the task.

An example of a traditional MCU employs internal flash memory coupled to the processing core of the MCU. Architectures with internal flash memory can avoid the use of external interfaces, thus, internal flash memory can be executed without much latency. While internal flash memory can alleviate some performance and speed issues that arise when using external flash memory, several issues remain when using internal flash memory. First, MCU designs that use higher performance processing cores typically lack availability to use embedded flash, and thus employ external flash. Similarly, several MCU designs employ multiple processing cores, which also reduces the amount of area available for internal flash memory. Secondly, internal flash memory is less configurable than external flash memory as internal flash memory is built into the architecture. This means internal flash memory cannot typically be upgraded if additional capacity is desired.

On the other hand, MCUs that employ external flash memory also have advantages and disadvantages. The use of external flash memory does allow an MCU to use higher performance processing cores using advanced silicon manufacturing process nodes given additional area in the design. However, when using external flash memory, MCUs employ interfaces to communicate with the external flash memory. Such interfaces can cause execution speed degradation and other issues, which result in slower performance of the MCU.

SUMMARY

Disclosed herein are improvements to software allocation among memory of a microcontroller unit (MCU). An example embodiment includes a method of operating such allocation techniques. The method comprises instructing the MCU to execute an application software, obtaining information indicative of a performance of portions of the application software on the MCU and capacity requirements of the portions of the application software. The method further comprises designating, based on the information, each of the portions of the application software for execution from either a first memory or a second memory when deployed to one or more MCUs.

This Summary is provided to introduce a selection of concepts in a simplified form that are further described below in the Detailed Description. It may be understood that this Summary is not intended to identify key features or essential features of the claimed subject matter, nor is it intended to be used to limit the scope of the claimed subject matter.

BRIEF DESCRIPTION OF THE DRAWINGS

The drawings are not necessarily drawn to scale. In the drawings, like reference numerals designate corresponding parts throughout the several views. In some examples, components or operations may be separated into different blocks or may be combined into a single block.

DETAILED DESCRIPTION

Discussed herein are enhanced components, techniques, and systems related to allocating application software among memory of a microcontroller unit (MCU). An MCU can be tasked with executing software to enable functionality of an application, device, or system. However, the MCU may lack the ability to execute all of the code and data of the software from internal memory under design restraints, costs, and other considerations. Further, while execution of parts of the software can be split amongst different memory of the MCU to enable execution and reduce latency in execution speed, this remains a manual process performed by an end user. Instead, as described herein, a computing device determines a placement of portions of application software with respect to multiple types of memory of the MCU. The computing device analyzes the code and data, execution(s) thereof, the MCU, and components of the MCU to determine the placement, among a memory hierarchy, for each portion of the software.

The computing device then distributes the placement of the portions of the code and data to one or more MCUs. Advantageously, such techniques and systems offer at least improved execution speed and reduced latency when one or more MCUs executes the software from different types of memory.

One example includes a method. The method comprises instructing an MCU to execute an application software; obtaining information indicative of a performance of portions of the application software on the MCU and capacity requirements of the portions of the application software; and designating, based on the information, each of the portions of the application software for execution from either a first memory or a second memory when deployed to one or more MCUs.

In another example, a computing device is provided. The computing device comprises one or more computer-readable storage media, a processing system operatively coupled with the one or more computer-readable storage media, and program instructions stored on the one or more computer-readable storage media that, based on being read and executed by the processing system, direct the computing device to perform various functions. For example, the program instructions can direct the computing device to instruct an MCU to execute an application software; obtain information indicative of a performance of portions of the application software on the MCU and capacity requirements of the portions of the application software; and designate, based on the information, each of the portions of the application software for execution from either a first memory or a second memory when deployed to one or more MCUs.

In yet another embodiment, one or more computer-readable storage media having program instructions stored thereon, wherein the program instructions, when read and executed by a processing system, direct the processing system to instruct an MCU to execute an application software; obtain information indicative of a performance of the portions of the application software on the MCU and capacity requirements of the portions of the application software; and designate, based on the information, each of the portions of the application software for execution from either a first memory or a second memory when deployed to one or more MCUs.

Figure 1:
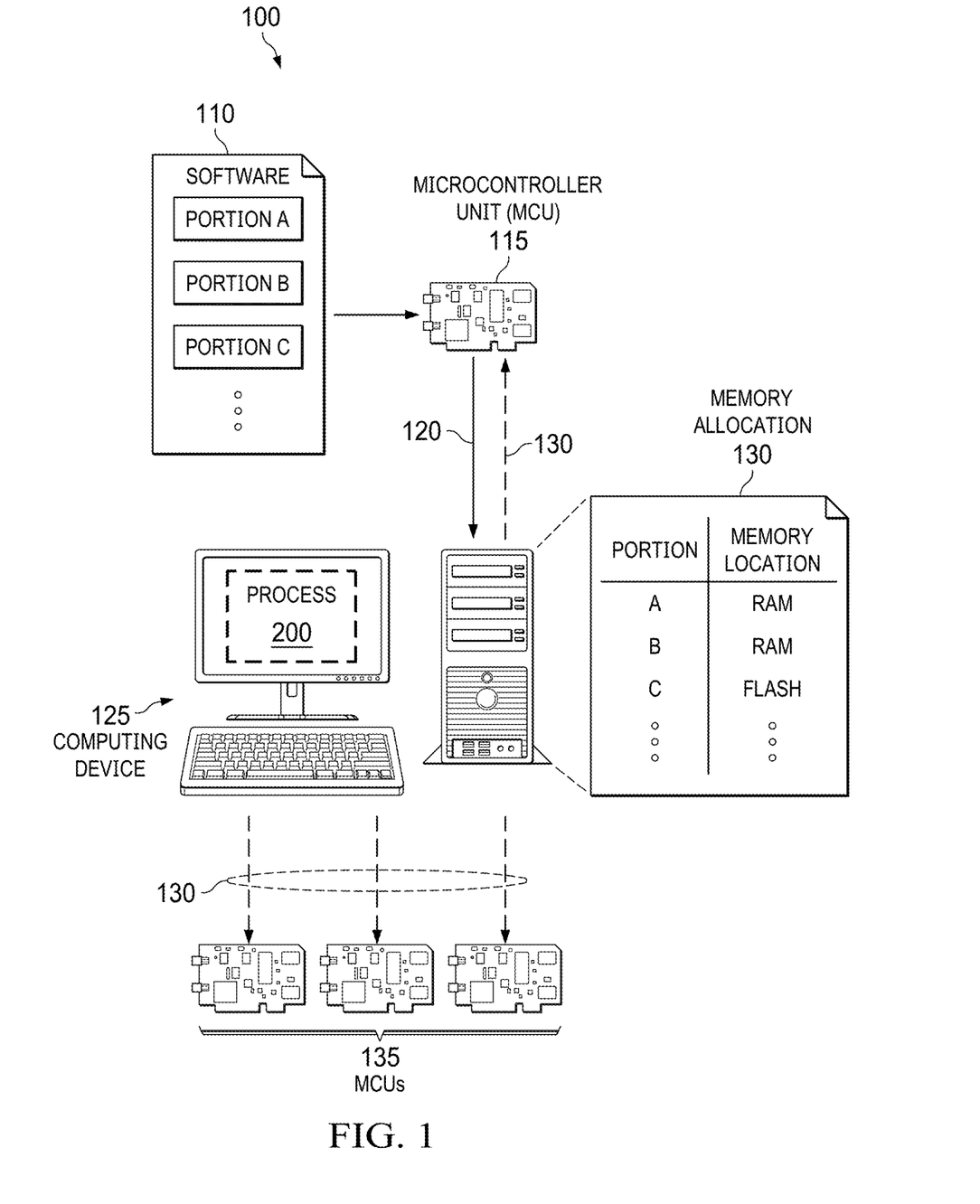
FIG. 1 illustrates an example operating environment configurable to perform memory allocation in an implementation.

FIG. 1 illustrates an example operating environment configurable to perform memory allocation processes in an implementation. FIG. 1 shows operating environment 100, which includes MCU 115, computing device 125, and MCUs 135. Computing device 125 is in communication with MCU 115 and MCUs 135 and determines a placement of portions of software 110 with respect to multiple types of memory of an MCU (e.g., MCU 115, MCUs 135). Computing device 125 can be configured to operate memory allocation processes, such as process 200 of FIG. 2, to determine from which memory an MCU can execute portions of software 110.

In operating environment 100, MCU 115 executes software 110 from one or more types of memory, such as non-volatile memory (e.g., flash memory) and/or volatile memory (e.g., random access memory (RAM), dynamic RAM (DRAM), double data rate (DDR)). Software 110 comprises a plurality of functions, blocks, individual lines of code (e.g., .txt), and read-only data (e.g., .const, .rodata) capable of enabling software functionality based on being read and executed by a processing device (e.g., a central processing unit (CPU)) of the MCU 115). Functions may include sections of code or procedures (also referred to herein as portions) that can be used repeatedly during an execution of software 110. Blocks may include portions of code existing within one or more functions of software 110. Examples of blocks of software 110 include for loops, while loops, if-else statements, and the like. As illustrated in operating environment 100, software 110 includes portions A, B, and C. Portions A, B, and C may include any combination or variation of software functions, blocks, individual lines of code, and read-only data. A peripheral (e.g., a device, application, or system) supplies the MCU 115 with software 110. In various examples, MCU 115 initially executes software 110 from flash memory. However, in some examples, MCU 115 executes software 110 from another location(s) based on a desired performance of the MCU 115, the capabilities of the components of the MCU 115, and/or a desired output or functionality enabled by executing software 110, among other factors. For example, RAM of the MCU 115 may have sufficient capacity to execute software 110 alone. Alternatively, RAM may not have sufficient capacity, so the MCU 115 may employ both RAM and flash memory to execute software 110.

After MCU 115 executes software 110, computing device 125 obtains information 120 indicative of a performance of portions of software 110 on the MCU 115 and capacity requirements of the portions of software 110. Information 120 can include two sets of data. One set of information 120 can indicate performance of the portions of software 110 on the MCU 115 and include statistics and metrics related to software 110, such as the number of functions and/or blocks of software 110, the number of lines of code within each function and/or block, and the execution frequency of each portion, among other information. Another set of information 120 can indicate capacity requirements of the portions and include data related to processing performance of components of the MCU 115, available capacity of such components, and capacity requirements of the portions of software 110. For example, such data indicates an amount of time required to complete an execution of software 110, the processing capability of flash memory and RAM of the MCU 115, the storage capacity of each type of memory, the amount of memory required to execute each of the portions of software 110, and the like. This information may be derived from the components of the MCU 115 themselves, or the information may be determined after analyzing an execution of software 110 by MCU 115. In various examples, software methods, such as methods to identify debug and profile information, can be used to collect information 120. In other examples, hardware methods, such as methods that use debug and trace processes to collect information from one or more chips on a printed circuit board (PCB), can be used to collect information 120. Some examples may use some combination of both hardware and software.

MCU 115 can also account for code other than software 110 being executed by the MCU 115 when identifying information 120. Accordingly, flash memory or RAM may have less processing capacity to execute software 110 if the MCU 115 executes code other than software 110.

MCU 115 provides information 120 to computing device 125. After obtaining information 120, computing device 125 analyzes information 120 using one or more algorithms. For example, computing device 125 can perform mathematical operations on information 120, such as cost, sort, and rank functions. Computing device 125 can employ algorithms on the data related to the performance of each portion of software 110. Computing device 125 generates output values for each portion of software 110 and ranks the output values among each other. Computing device 125 can also employ algorithms on the data related to the capacity requirements of each portion of software 110 to calculate output values related to the capacity requirements. In various examples, the output values related to capacity requirements indicate the time required to execute each portion of software 110 on RAM and the time required to execute each portion of software 110 on flash memory.

After performing these operations on information 120, computing device 125 merges the output values and ranks the output values with respect to one another. Computing device 125 uses the ranked information to determine where to designate each portion (i.e., whether the software code and/or data should be executed from flash memory or RAM) and produce memory allocation 130 using the designations. Computing device 125 designates portions of software 110 for execution either from one type of memory or another type of memory based on, for example, how efficiently or effectively an MCU (e.g., MCU 115 or one or more MCUs of MCUs 135) can execute the portion of software 110 from each type of memory. In some cases, portions of software 110 with higher execution frequencies than others, larger portions (with respect to other portions), and/or complex portions (with respect to other portions) may be executed from one memory location instead of another based on execution performance and latency at the respective memory location, among other factors. For example, as illustrated in operating environment 100, memory allocation 130 can indicate that an MCU (e.g., MCU 115 or one or more MCUs of MCUs 135) can execute portions A and B from RAM, while the MCU can execute portion C from flash memory. Computing device 125 deploys memory allocation 130 to one or more MCUs, including or excluding MCU 115 or MCUs 135, to execute software 110 according to memory allocation 130. Memory allocation 130 can indicate locations and addresses to associate a given portion of software 110 with a corresponding memory.

In various examples, MCU 115 executing software 110, or portions of software 110, involves the MCU 115 executing some of the program instructions and data of software 110 to collect information 120. However, in other examples, MCU 115 executes all of the program instructions and data of software 110 to obtain information 120.

Referring to FIG. 1, MCU 115 of operating environment 100 can represent a physical MCU configured to execute software 110 during runtime, or MCU 115 can represent a virtual MCU configured to generate, collect, and distribute information 120 from execution of software 110. In some examples, MCU 115 receives memory allocation 130 to enable software functionality. In other examples, MCU 115 communicates information 120 to computing device 125 so computing device 125 can deploy memory allocation 130 downstream to other MCUs (MCUs 135). MCUs 135 can be of the same type, model, or architecture as MCU 115. For example, MCUs 135 can have the same memory hierarchy as MCU 115 does, such that memory allocation 130 can be mapped accordingly. In some examples, the MCUs 135 can be of a different type, model, or architecture compared to MCU 115, and the computing device 125 can deploy memory allocation 130 regardless of the differences between MCUs 135 and MCU 115.

In some examples, flash memory is employed as non-volatile memory capable of storing portions of software 110. Flash memory, or any other non-volatile memory, may be external to the MCU 115 (or other MCUs 135) with respect to RAM, but flash memory may also be internal to an MCU. Other types of non-volatile memory may be contemplated and used as a substitute for or in addition to flash memory. Further, other types of volatile memory, in addition to internal volatile memory, can be used instead of flash memory. In some examples, an MCU can include volatile memory, such as RAM. Examples of volatile memory include RAM, static RAM (SRAM), DRAM, DDR, cache memory, tightly coupled memory (TCM), and the like.

Figure 2:
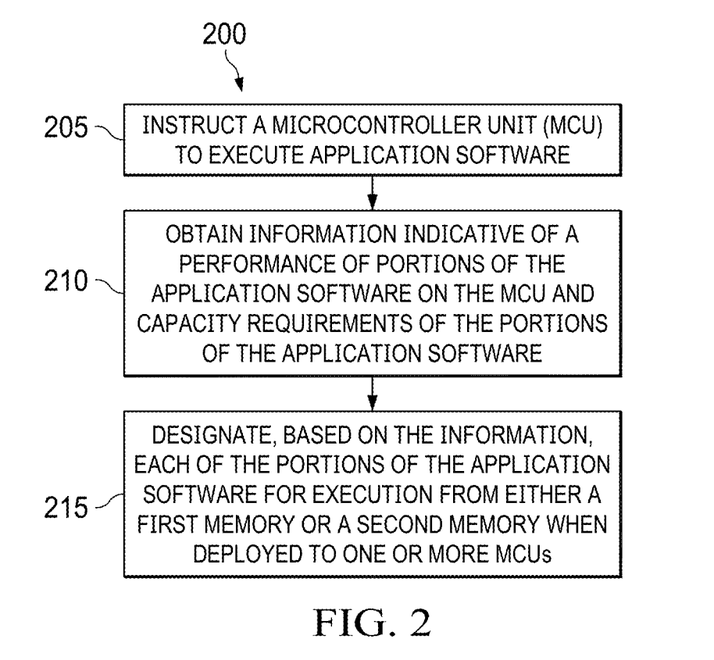
FIG. 2 illustrates a series of steps for allocating portions of application software for execution from different types of memory of a microcontroller unit.

FIG. 2 illustrates operations for designating portions of application software for execution from different types of memory of an MCU. FIG. 2 includes process 200 described parenthetically below, which references elements of FIG. 1. Process 200 can be implemented on software, firmware, and/or hardware, or any combination or variation thereof. For example, a computing device, such as computing device 125 of operating environment 100 of FIG. 1, can perform process 200.

In operation 205, computing device 125 instructs (205) MCU 115 to execute software 110. Software 110 comprises a plurality of functions, blocks, lines of code, and read-only data (referred to as portions) capable of enabling software functionality when read and executed by a processing device, such as a CPU. A peripheral (e.g., a device, application, or system) can supply the MCU 115 with software 110. MCU 115 can then execute software 110 from one or more types of memory internal and/or external memory (e.g., flash memory, RAM, tightly coupled memory). In various examples, MCU 115 initially executes software 110 from flash memory. However, MCU 115 may execute software 110 from another location based on a desired performance of the MCU 115, the capabilities of the components of the MCU 115, and/or a desired output or functionality enabled by executing software 110, among other factors. For example, RAM of the MCU 115 may have sufficient capacity to execute software 110 alone. Alternatively, RAM may not have sufficient capacity, so MCU 115 may employ both RAM and flash memory to execute software 110.

Next, in operation 210, computing device 125 obtains (210), from MCU 115, information 120 indicative of a performance of portions of software 110 on the MCU 115 and indicative of capacity requirements of the portions of software 110. In several examples, information 120 can include statistics and metrics related to software 110, such as the number of functions and/or blocks of software 110, the number of lines of code within each function and/or block, and the execution frequency of each portion, among other information. Additionally, information 120 can include data indicating capacity requirements of the portions of software 110, such as an amount of time required to complete an execution of each portion of software 110, the processing capability of flash memory and RAM of the MCU 115, the storage capacity of each type of memory, the amount of memory required to execute each of the portions of software 110, and the like. This information can be derived from the components of the MCU 115 themselves, or the information can be determined after analyzing an execution of software 110 by the MCU 115. Once MCU 115 has completed an execution of software 110, MCU 115 provides information 120 to computing device 125.

In operation 215, computing device 125 designates (215), based on information 120, each of the portions of software 110 for execution either from a first memory and a second memory when deployed to one or more MCUs, such as MCU 115 and/or MCUs 135. The first and second memories are different memory locations, and they can include volatile memory, non-volatile memory, or some variation or combination thereof. To determine which memory to designate each of the portions of software 110 for execution, computing device 125 analyzes information 120 using one or more algorithms. For example, computing device 125 can perform mathematical operations, such as cost, sort, and rank functions, on data of information 120 related to the performance of each portion of software 110. Computing device 125 generates output values for each portion of software 110 and ranks the output values among each other. Computing device 125 can also use algorithms on the data of information 120 related to the capacity requirements of each portion of software 110 to calculate output values related to the capacity requirements. In various examples, the output values related to capacity requirements indicate the time required to execute each portion of software 110 on RAM and the time required to execute each portion of software 110 on flash memory. Computing device 125 merges the output values and rank the output values with respect to one another. Computing device 125 uses the ranked outputs to determine where to designate each portion and produces memory allocation 130 using the designations. Memory allocation 130 can include the designations of the portions of software 110 to corresponding memories of MCU 115 and/or MCUs 135. For instance, memory allocation 130 can include a mapping of locations or addresses associated with different memories of an MCU (e.g., MCU 115 and/or MCUs 135) and corresponding portions of software 110, such that, when an MCU executes software 110 according to memory allocation 130, the MCU executes portions of software 110 from designated memories according to memory allocation 130.

Figure 3:
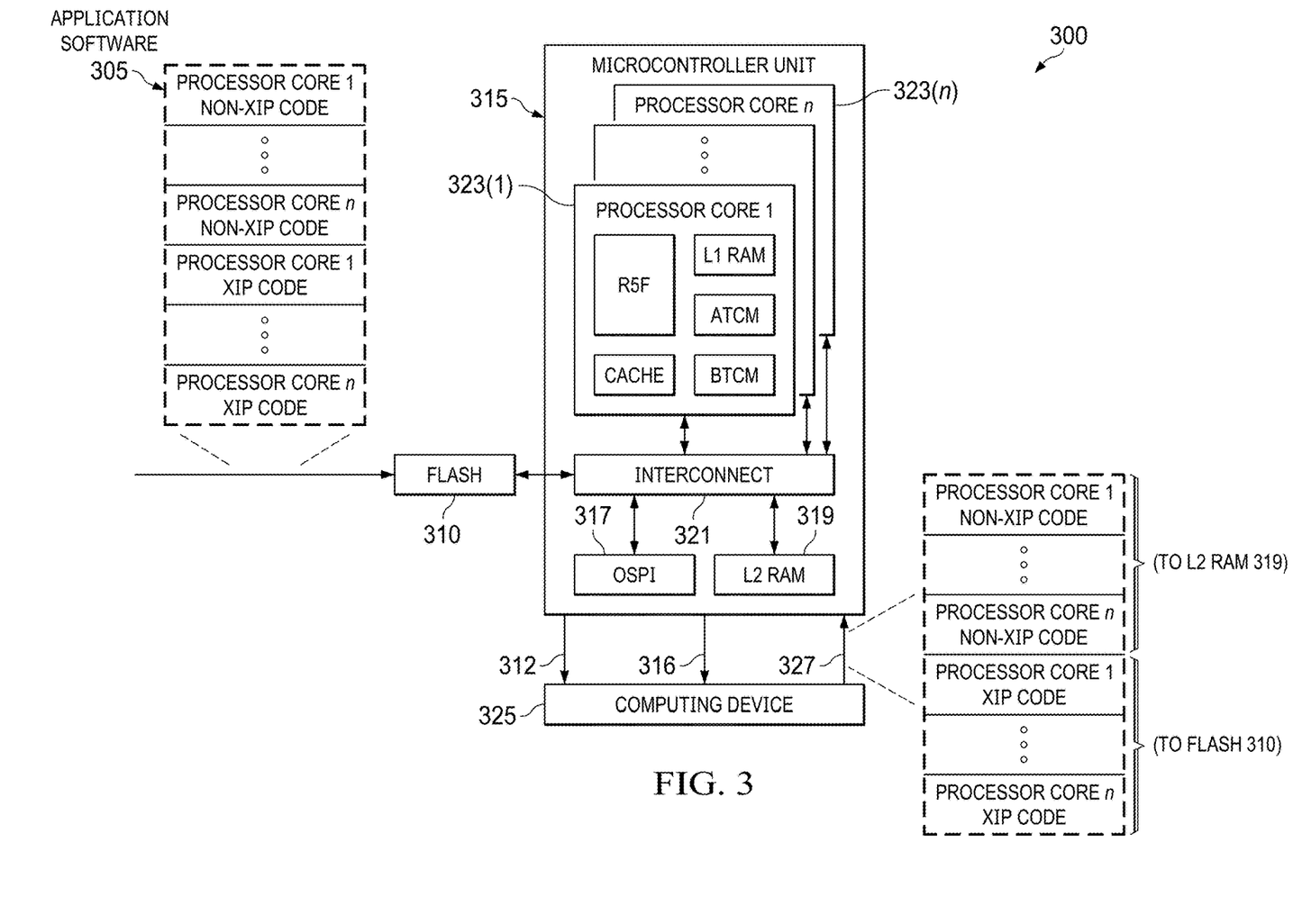
FIG. 3 illustrates an example operating environment for allocating portions of application software among different memory of a microcontroller unit.

FIG. 3 illustrates an example operating environment for allocating portions of application software among different types of memory of a microcontroller unit. FIG. 3 includes operating environment 300, which further includes flash 310, MCU 315, and computing device 325. MCU 315 includes octal serial peripheral interface (OSPI) 317, level-two (L2) RAM 319, interconnect 321, and processor core 323(1) (referred to generally as processor core 323), among any number of other processing cores.

In operation, components of operating environment 300 are configured to execute application software 305, to obtain information (e.g., performance information 312 and capacity information 316) indicative of a performance of portions of application software 305 on MCU 315 and capacity requirements of the portions of application software 305, and to analyze such information to determine an allocation for the portions of application software 305 among memory of MCU 315 (e.g., flash 310, level-one (L1) RAM of processor core 323, and L2 RAM 319). In the example of FIG. 3, MCU 315 has a first level of internal RAM (e.g., L1 RAM) on processor core 323, a second level of internal RAM (L2 RAM 319), and tightly coupled memories (e.g., tightly coupled memory A (ATCM) and tightly coupled memory B (BTCM)). Processor core 323, and each other processor core, if included, can be configured to fetch portions of application software 305 from respective locations according to memory allocation 327 and execute application software 305 according to memory allocation 327. Flash 310 is flash memory, or non-volatile memory, capable of storing portions of application software 305.

Application software 305 comprises a plurality of functions, blocks within each of the functions, lines of code, and data, which, when executed together by a processing core of MCU 315, such as processor core 323, can enable software functionality of an application. Portions of application software 305 can include one or more of the aforementioned parts of application software 305, or any variation or combination thereof. In some examples, application software 305 can include non-execute-in-place (non-XIP) code and execute-in-place (XIP) code associated with the number of processing cores of MCU 315. A peripheral can load application software 305 onto flash 310. MCU 315 can subsequently move/load portions of application software 305 to other memory after boot-up. In various examples, MCU 315 initially performs an execution of application software 305 to generate data about application software 305. In some cases, MCU 315 can execute application software 305 from flash 310. However, in other cases, MCU 315 can execute application software 305 from flash 310 and/or internal RAM of MCU 315.

Following an initial execution of application software 305, MCU 315 produces performance information 312 and capacity information 316. Performance information 312 can indicate performance of the portions of application software 305 on MCU 115 and can include statistics and metrics related to application software 305, such as the number of functions and/or blocks of application software 305, the number of lines of code within each function and/or block, and the execution frequency of each portion, among other information. Capacity information 316 can indicate capacity requirements of the portions and can include data related to processing performance of components of MCU 315, available capacity of such components, and capacity requirements of the portions of application software 305. In an example, capacity information 316 can indicate an amount of time required to complete an execution of application software 305, the processing capability of flash 310, L2 RAM 319, and L1 RAM of processor core 323, the storage capacity of each type of memory, the amount of memory required to execute each of the portions of application software 305, and the like. This information can be derived from the components of MCU 315 themselves, or the information can be determined after analyzing an execution of application software 305 by MCU 315. In various examples, software methods, such as methods to identify debug and profile information, can be used to collect performance information 312 and capacity information 316. In other examples, hardware methods, such as methods that use debug and trace processes to collect information from one or more chips on a printed circuit board (PCB), can be used to collect such information. Some examples may use some combination of both hardware and software. Once MCU 315 identifies performance information 312 and capacity information 316, MCU 315 provides performance information 312 and capacity information 316 to computing device 325 via an interface of MCU 315.

Computing device 325 analyzes performance information 312 and capacity information 316 using one or more algorithms. For example, computing device 325 can perform cost, sort, and rank operations on performance information 312 and capacity information 316. Computing device 325 can first determine values related to the performance of each portion of application software 305. These values can indicate an execution frequency of each portion, for example, among other metrics. Then, computing device 325 can rank each of the performance-related values with respect to one another (e.g., from most frequently executed to least frequently executed). Computing device 325 can also determine values related to capacity. The capacity-related values can indicate an amount of time it takes to perform an execution of each portion of application software 305. Computing device 325 also ranks each of the capacity-related values with respect to one another (e.g., from longest execution time to shortest execution time). Computing device 325 merges both sets of values determined using performance information 312 and capacity information 316 and ranks all of the values in the merged set to produce memory allocation 327.

Memory allocation 327 can be a command file (e.g., a linker file or linker script) with addresses and instructions readable by MCU 315. For instance, memory allocation 327 can include a mapping with locations/addresses associated with different memories of MCU 315 (or another MCU, such as flash 310, L1 RAM, ATCM/BTCM, and/or L2 RAM 319, and corresponding portions of application software 305. When an MCU executes application software 305 according to memory allocation 327, the MCU may now execute portions of application software 305 from different memories than it had during previous executions. For example, the MCU can execute frequently run portions, larger portions, and/or more complex portions from a memory that has the capacity to execute the portion(s) with increased efficiency, among other improvements. As illustrated in operating environment 300, MCU 315 can execute a portion of application software 305 from L2 RAM 319 and a different portion of application software 305 from flash 310 when MCU 315 executes application software 305 according to memory allocation 327. In other examples, MCU 315 can execute portions of application software 305 from any other variation or combination of memory (e.g., memory of processor core 323, L2 RAM 319, flash 310).

In various examples, MCU 315 includes different components (processor cores, interfaces (e.g., expanded serial peripheral interface (xSPI)), RAM, levels of RAM or other memory) than those illustrated in operating environment 300 located internally and/or externally to MCU 315. For example, flash 310 can be located internally with respect to MCU 315 as opposed to functioning externally to MCU 315. Regardless of the architecture of MCU 315, MCU 315 can be configured to receive memory allocation 327 and execute portions of application software 305 from memory locations consistent with memory allocation 327.

Figure 4:
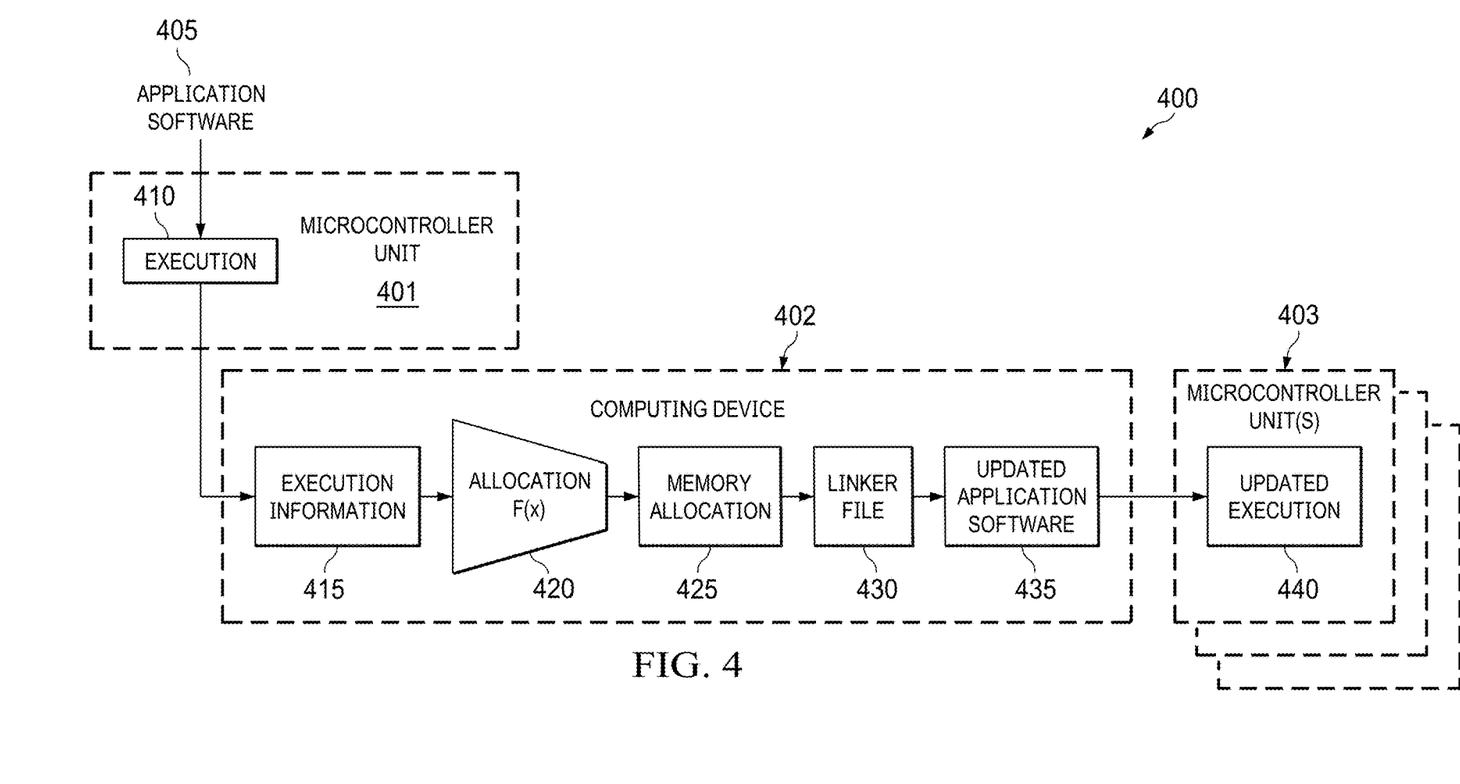
FIG. 4 illustrates an example operating environment for allocating portions of application software among memory of a microcontroller unit.

FIG. 4 illustrates an example operating environment for allocating portions of application software among different types of memory of a microcontroller unit. FIG. 4 includes operating environment 400, which includes MCU 401, computing device 402, and MCUs 403. MCU 401 and computing device 402 can each perform different processes and functions that, together, produce an allocation, for distribution to one or more of MCUs 403, indicating storage locations and corresponding portions of application software 405 (i.e., code and corresponding data).

As illustrated in FIG. 4, MCU 401 performs execution 410. Execution 410 involves the MCU 401 executing application software 405, which includes code (e.g., functions, blocks, lines of code) and data (e.g., read-only data) supplied by a peripheral, from memory of MCU 401.

After execution 410, computing device 402 obtains, from MCU 401, execution information 415 indicative of a performance of the portions of application software 405 on MCU 401 and capacity requirements of the portions of application software 405. Execution information 415 can indicate performance of the portions of application software 405 on MCU 401 and include statistics and metrics related to application software 405, such as the number of functions and/or blocks of application software 405, the number of lines of code within each function and/or block, and the execution frequency of each portion, among other information. Execution information 415 can also indicate capacity requirements of the portions of application software 405 and include data related to processing performance of components of MCU 401, available capacity of such components, and capacity requirements of the portions of application software 405. For example, such information can indicate an amount of time required to complete execution 410, the processing capability of the different types of memory of MCU 401, the storage capacity of each type of memory, the amount of memory required to execute each of the portions of application software 405, and the like. After computing device 402 obtains execution information 415, computing device 402 supplies execution information 415 as an input to allocation function 420.

Allocation function 420 includes one or more algorithms for determining an allocation of the portions of application software 405 among the memory of MCU 401, or another MCU (i.e., one or more of MCUs 403). Allocation function 420 can involve the computing device 402 performing one or more mathematical operations on execution information 415 to determine a designation for each portion of application software 405 among memory. In various examples, computing device 402 utilizes allocation function 420 to determine a performance of each portion of application software 405 and a capacity requirement of each portion of application software 405. Upon calculating the performances (e.g., portion execution frequency) and capacity requirements (e.g., required capacity to execute a portion), computing device 402 can sort and rank the calculated outputs among each other to produce memory allocation 425. Computing device 402 can rank the outputs of execution information 415 and produce memory allocation 425 to allow an MCU to execute the most frequency executed portions, the largest portions, and/or the most complex portions from a respective memory location that has capacity, for example, to execute the portion(s).

Computing device 402 uses memory allocation 425 to create linker file 430. Linker file 430 includes addresses and instructions for an MCU (e.g., MCU 401 or MCUs 403) to execute the portions of application software 405 from designated memories. For example, linker 430 includes a mapping with locations/addresses associated with different memories of an MCU and corresponding portions of application software 405. Computing device 402 applies linker file 430 to application software 405 to create updated application software 435. Application of linker file 430 to application software 405 includes updating the addresses of code and data of application software 405 with the mapping of linker file 430 and compiling the code and data with the mapping. Computing device 402 deploys updated application software 435 to MCUs 403. Updated application software 435 can be a binary including the same content as application software 405 but with a different memory configuration/allocation.

MCUs 403 represents one or more MCUs, including or excluding MCU 401, that can be configured to perform updated execution 440 using updated application software 435. Updated execution 440 refers to a subsequent (e.g., runtime) execution of application software 405 according to linker file 430 (i.e., now updated application software 435). Accordingly, an MCU of MCUs 403 that executes updated application software 435 executes portions of updated application software 435 from different memories per the designations determined by computing device 402. Thus, updated execution 440 enables improved functionality of the code and data on MCUs 403.

Figure 5:
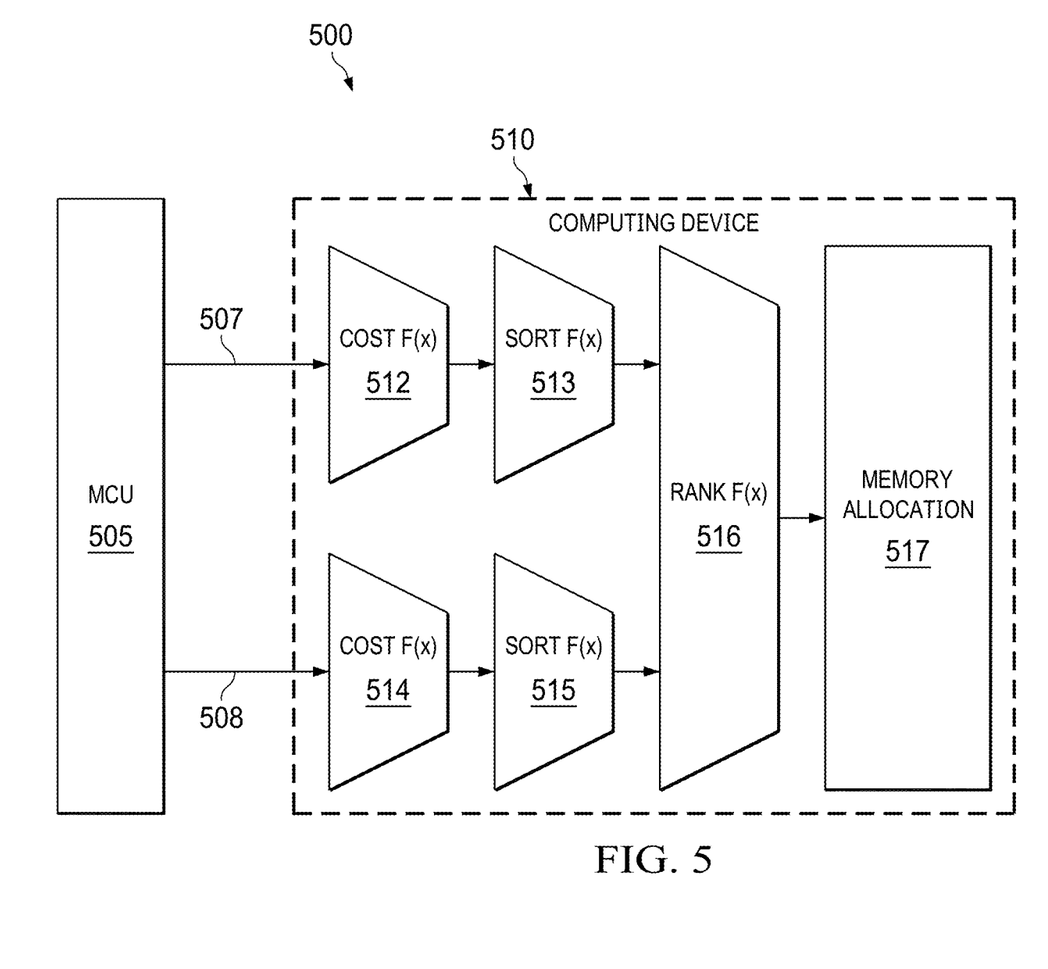
FIG. 5 illustrates example algorithms for producing a memory allocation to be implemented in a microcontroller unit.

FIG. 5 illustrates example algorithms for producing a memory allocation for an MCU. FIG. 5 includes operating environment 500, which includes MCU 505 and computing device 510. As illustrated, computing device 510 employs cost functions 512 and 514, sort functions 513 and 515, and rank function 516. MCU 505 provides statistics and metrics to the computing device 510, and in turn, computing device 510 uses the statistics and metrics from the MCU 505 as inputs to cost functions 512 and 514. The computing device 510 sorts the outputs of cost functions 512 and 514 via sort functions 513 and 515, respectively. The computing device 510 generates memory allocation 517 using rank function 516 from the sorted outputs of sort functions 513 and 515. A computing device, such as computing device 125 of FIG. 1, computing device 325 of FIG. 3, or computing device 402 of FIG. 4, can perform the algorithms exemplified in operating environment 500.

As described herein, the MCU 505 executes software (e.g., software 110, application software 305, application software 405) and obtains performance information 507 indicative of a performance of portions of the software on MCU 505. For example, performance information 507 includes statistics and metrics related to the execution of the software, such as the number of functions and/or blocks of software present, the number of lines of code within each function and/or block, and the execution frequency of each portion, among other information.

MCU 505 provides performance information 507 to computing device 510. As mentioned, computing device 510 determines a placement of each of the portions of software (e.g., functions, blocks, lines of code, subsets thereof, and any combination or variation thereof) among memory of MCU 505 or other MCUs. To determine the placement, computing device 510 performs cost function 512 on performance information 507. Cost function 512 involves one or more mathematical operations on performance information 507 to determine values for each portion of the software. In various examples, cost function 512 can employ the following equation to determine such values:

$$Fi * \text{sum}(FBij * (FBLOCij/FLOCij)).$$

In this equation, "Fi" represents function execution frequency, or how frequently MCU 505 executes each function of the software during an execution; "FBij" represents block frequency, or how frequently MCU 505 executes each block during an execution; "FBLOCij" represents lines of code by block frequency, or how frequency MCU 505 executes each line of code within a block; and "FLOCij" represents lines of code by function frequency, or how frequency MCU 505 executes each line of code within a function. Computing device 510 provides the values obtained from cost function 512 to sort function 513.

Sort function 513 involves computing device 510 sorting the output values from cost function 512 (e.g., from greatest to least with respect to frequency). In some examples, sort function 513 can employ the following equation to quantize the frequency of the functions, blocks, and lines of code:

$$SORT(\text{Log}10(x)).$$

In this equation "x" represents a value from cost function 512.

Similarly, MCU 505 identifies capacity information 508 indicative of capacity requirements of the portions of software. Capacity information 508 can include statistics related to the amount of time to complete the execution of each portion of the software during the evaluation period (e.g., a test period before runtime), the processing capability of each type of memory of MCU 505 (e.g., flash memory, RAM), the storage capacity of the memories, and the like. MCU 505 provides capacity information 508 to computing device 510.

Computing device 510 performs cost function 514 on capacity information 508. Like cost function 512, cost function 514 involves computing device 510 calculating one or more values related to capacity for each portion of the software. Cost function 514 may involve using the following equation to calculate the one or more values:

$$TFLASHi/TRAMi.$$

In this equation, "TFLASHi" represents the estimated execution time of the software (or a portion of the software) when executed from flash memory of MCU 505; and "TRAMi" represents the estimated execution time of the software (or a portion of the software) when executed from RAM of MCU 505. Computing device 510 provides the output of cost function 514 to sort function 515 to sort the values (e.g., from greatest to least with respect to execution time).

Computing device 510 provides the outputs of sort functions 513 and 515 to rank function 516. Computing device 510 uses rank function 516 to rank and/or prioritize each value from sort functions 513 and 515. In some examples, computing device 510 uses the following equation to determine a placement priority of the software portions:

$$A * R1 + (1 - A) * R2$$

In this equation, A is a constant value determined by executing the software numerous times during the evaluation period. R1 is the ranked list of outputs produced using sort function 513. R2 is the ranked list of outputs produced using sort function 515. Using this equation for rank function 516, computing device 510 correlates each portion of the software with a memory of MCU 505. Computing device 510 produces memory allocation 517 according to the correlations and provides memory allocation 517 downstream to MCU 505 and/or other MCUs.

Figure 6:
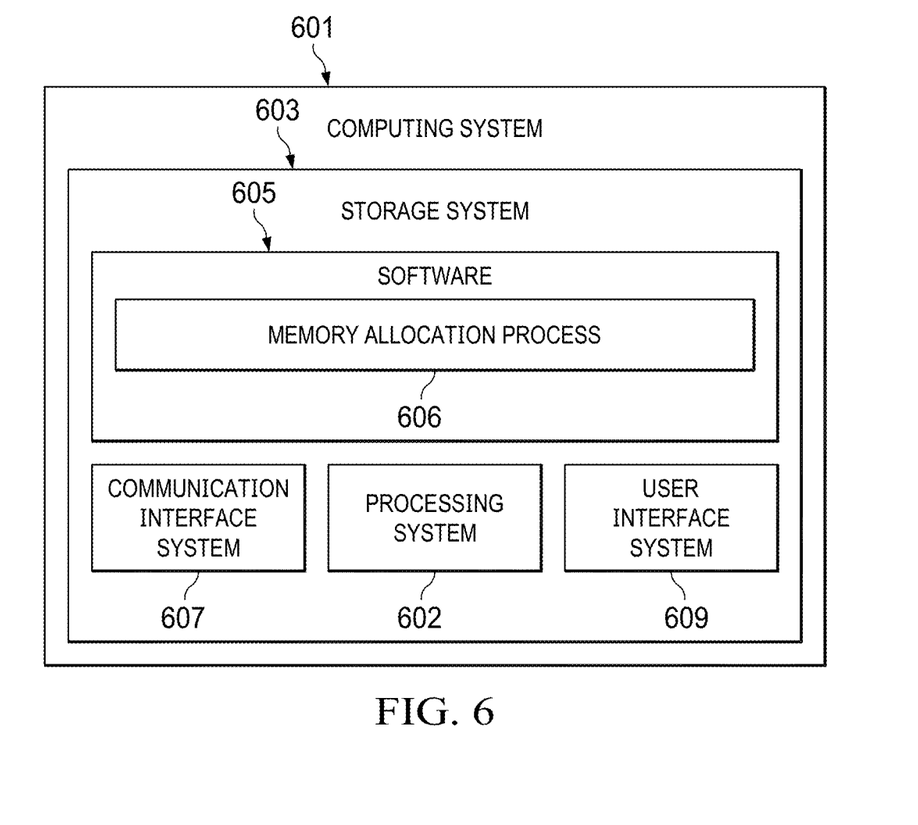
FIG. 6 illustrates a computing device that may be used in accordance with some examples of the present technology.

FIG. 6 illustrates computing system 601 to perform instruction and data allocation among memory of an MCU, according to an implementation of the present technology. Computing system 601 is representative of any system or collection of systems with which the various operational architectures, processes, scenarios, and sequences disclosed herein for memory allocation may be employed. Computing system 601 may be implemented as a single apparatus, system, or device or may be implemented in a distributed manner as multiple apparatuses, systems, or devices. Computing system 601 includes, but is not limited to, processing system 602, storage system 603, software 605, communication interface system 607, and user interface system 609 (optional). Processing system 602 is operatively coupled with storage system 603, communication interface system 607, and user interface system 609. Computing system 601 may be representative of a cloud computing device, distributed computing device, or the like.

Processing system 602 loads and executes software 605 from storage system 603. Software 605 includes and implements memory allocation process 606, which is representative of any of the code analyzing, sorting, ranking, and allocating processes discussed with respect to the preceding Figures. When executed by processing system 602 to provide memory allocation functions, software 605 directs processing system 602 to operate as described herein for at least the various processes, operational scenarios, and sequences discussed in the foregoing implementations. Computing system 601 may optionally include additional devices, features, or functionality not discussed for purposes of brevity.

Referring still to FIG. 6, processing system 602 may comprise a micro-processor and other circuitry that retrieves and executes software 605 from storage system 603. Processing system 602 may be implemented within a single processing device but may also be distributed across multiple processing devices or sub-systems that cooperate in executing program instructions. Examples of processing system 602 include general purpose central processing units, graphical processing units, application specific processors, and logic devices, as well as any other type of processing device, combinations, or variations thereof.

Storage system 603 may comprise any computer readable storage media readable by processing system 602 and capable of storing software 605. Storage system 603 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 603 may also include computer readable communication media over which at least some of software 605 may be communicated internally or externally. Storage system 603 may be implemented as a single storage device but may also be implemented across multiple storage devices or sub-systems co-located or distributed relative to each other. Storage system 603 may comprise additional elements, such as a controller, capable of communicating with processing system 602 or possibly other systems.

Software 605 (including memory allocation process 606) may be implemented in program instructions and among other functions may, when executed by processing system 602, direct processing system 602 to operate as described with respect to the various operational scenarios, sequences, and processes illustrated herein. For example, software 605 may include program instructions for implementing a memory allocation process as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 605 may include additional processes, programs, or components, such as operating system software, virtualization software, or other application software. Software 605 may also comprise firmware or some other form of machine-readable processing instructions executable by processing system 602.

In general, software 605 may, when loaded into processing system 602 and executed, transform a suitable apparatus, system, or device (of which computing system 601 is representative) overall from a general-purpose computing system into a special-purpose computing system customized to provide memory allocation as described herein. Indeed, encoding software 605 on storage system 603 may transform the physical structure of storage system 603. The specific transformation of the physical structure may depend on various factors in different implementations of this description. Examples of such factors may include, but are not limited to, the technology used to implement the storage media of storage system 603 and whether the computer-storage media are characterized as primary or secondary storage, as well as other factors.

For example, if the computer readable storage media are implemented as semiconductor-based memory, software 605 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 607 may include communication connections and devices that allow for communication with other computing systems (not shown) over communication networks (not shown). Examples of connections and devices that together allow for inter-system communication may include network interface cards, antennas, power amplifiers, radiofrequency circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 601 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of networks, or variation thereof. The aforementioned communication networks and protocols are well known and need not be discussed at length here.

While some examples provided herein are described in the context of an image sensor, layer, or environment, it should be understood that the memory allocation methods, techniques, and systems described herein are not limited to such examples and may apply to a variety of other processes, systems, applications, devices, and the like. As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The phrases "in some examples," "according to some examples," "in the examples shown," "in other examples," and the like generally mean the particular feature, structure, or characteristic following the phrase is included in at least one implementation of the present technology, and may be included in more than one implementation. In addition, such phrases do not necessarily refer to the same example or different examples.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112 (f) will begin with the words "means for" but use of the term "for" in any other context is not intended to invoke treatment under 35 U.S.C. § 112 (f). Accordingly, the applicant reserves the right to pursue additional claims after filing this application to pursue such additional claim forms, in either this application or in a continuing application.

What is claimed is:

1. A method, comprising:
obtaining information indicative of performance of portions of an application software on a microcontroller unit (MCU) and capacity requirements of the portions of the application software;
determining, based on the information, each of the portions of the application software to be executed using Execute-in-Place (XIP) or non-Execute-in-Place (non-XIP); and
generating, based on the determining, memory allocation for execution of the application software.

2. The method of claim 1, wherein the information indicative of the performance of the portions of the application software comprises information indicative of at least one of: a number of functions in the application software, a number of lines of code within each of the functions of the application software, or an execution frequency of each of the portions of the application software.

3. The method of claim 2, wherein the information indicative of the capacity requirements of the portions of the application software comprises information indicative of at least one of: an amount of time associated with executing the application software, processing capacity of an internal memory of the MCU, processing capacity of an external memory of the MCU, storage capacity of the internal memory of the MCU, or storage capacity of the external memory of the MCU.

4. The method of claim 3, further comprising analyzing the information indicative of the performance of the portions of the application software and the capacity requirements of the portions of the application software using respective cost functions to generate respective results.

5. The method of claim 4, wherein analyzing the information indicative of the performance of the portions of the application software comprises performing a first cost function on the execution frequency of each of the portions of the application software and the number of lines of code within each of the functions of the application software.

6. The method of claim 4, wherein analyzing the information indicative of the capacity requirements of the portions of the application software comprises performing a second cost function on the amount of time for executing the application software from the internal memory and external memory of the MCU.

7. The method of claim 4, further comprising sorting the respective results from the analyzing of the information to generate respective sorting results.

8. The method of claim 7, wherein sorting the respective results comprises sorting the respective results using a logarithmic function.

9. The method of claim 7, further comprising ranking the respective sorting results to generate a ranking result.

10. The method of claim 9, wherein determining each of the portions of the application software to be executed using XIP or non-XIP comprises determining each of the portions of the application software to be executed using XIP or non-XIP based on the ranking result.

11. The method of claim 1, further comprising executing the application software on the MCU to provide the information indicative of the performance of portions of the application software and the capacity requirements of the portions of the application software.

12. The method of claim 11, wherein executing the application software on the MCU comprises executing the application software from an external memory of the MCU.

13. The method of claim 12, wherein the external memory is a flash memory, and executing the application software from the flash memory comprises executing the application software using XIP.

14. The method of claim 1, wherein the memory allocation indicates each of the portions of the application software to be executed from an external memory of a MCU using XIP or an internal memory of the MCU using non-XIP.

15. The method of claim 14, wherein the internal memory is a random-access memory (RAM), and the external memory is a flash memory.

16. One or more non-transitory computer-readable storage media having program instructions stored thereon, wherein the program instructions, when executed by a processing system, cause the processing system to:
obtain information indicative of performance of portions of an application software on a microcontroller unit (MCU) and capacity requirements of the portions of the application software;
determine, based on the information, each of the portions of the application software to be executed using Execute-in-Place (XIP) or non-Execute-in-Place (non-XIP); and
generate, based on the determination, memory allocation for execution of the application software.

17. The one or more non-transitory computer-readable storage media of claim 16, wherein the information indicative of the performance of portions of the application software and the capacity requirements of the portions of the application software is generated based on execution of the application software on the MCU.

18. The one or more non-transitory computer-readable storage media of claim 17, wherein the execution of the application software on the MCU is performed from a flash memory of the MCU.

19. The one or more non-transitory computer-readable storage media of claim 16, wherein the information indicative of the performance of the portions of the application software comprises information indicative of at least one of: a number of functions in the application software, a number of lines of code within each of the functions of the application software, or an execution frequency of each of the portions of the application software, and wherein the information indicative of the capacity requirements of the portions of the application software comprises information indicative of at least one of: an amount of time associated with executing the application software, processing capacity of different memories of the MCU, or storage capacity of the different memories of the MCU.

20. The one or more non-transitory computer-readable storage media of claim 16, wherein the memory allocation indicates each of the portions of the application software to be executed from a flash memory of a MCU using XIP or a random-access memory (RAM) of the MCU using non-XIP.

* * * * *